US009297923B2

(12) United States Patent
Muyzert et al.

(10) Patent No.: US 9,297,923 B2
(45) Date of Patent: Mar. 29, 2016

(54) GRAVITY MEASUREMENTS USING SEISMIC STREAMERS

(75) Inventors: Everhard Muyzert, Girton (GB); Philip A. F. Christie, Fen Drayton (GB); Nicolas Goujon, Oslo (NO); Julian Edward (Ed) Kragh, Finchingfield (GB); Johan O. A. Robertsson, Grantchester (GB)

(73) Assignee: WESTERNGECO L.L.C., Houston, TX (US)

( * ) Notice: Subject to any disclaimer, the term of this patent is extended or adjusted under 35 U.S.C. 154(b) by 686 days.

(21) Appl. No.: 12/938,866

(22) Filed: Nov. 3, 2010

(65) Prior Publication Data

US 2011/0211423 A1 Sep. 1, 2011

Related U.S. Application Data

(60) Provisional application No. 61/309,254, filed on Mar. 1, 2010.

(51) Int. Cl.
*G01V 1/38* (2006.01)
*G01V 7/00* (2006.01)
*G01V 7/16* (2006.01)
*G01V 7/06* (2006.01)

(52) U.S. Cl.
CPC ... *G01V 7/00* (2013.01); *G01V 7/06* (2013.01); *G01V 7/16* (2013.01); *G01V 2210/6165* (2013.01)

(58) Field of Classification Search
CPC ............. G01V 7/00; G01V 7/06; G01V 7/16; G01V 11/00; G01V 2210/6165
USPC ......... 73/1.01, 1.37, 382 G, 570, 579, 382 R; 181/102, 108, 110, 112, 139; 324/331; 340/870.05; 367/14, 15, 20, 21, 23, 32, 367/41, 50, 63, 68, 117, 43, 178; 702/5, 17, 702/18, 92
See application file for complete search history.

(56) References Cited

U.S. PATENT DOCUMENTS

| | | | | |
|---|---|---|---|---|
| 6,082,194 A * | 7/2000 | Gladwin | ...................... | 73/382 G |
| 6,151,556 A * | 11/2000 | Allen | ................ | 702/18 |
| 6,208,587 B1 * | 3/2001 | Martin | ............. | 367/50 |
| 6,353,577 B1 * | 3/2002 | Orban et al. | ................ | 367/43 |
| 6,450,028 B1 | 9/2002 | Vail, III | | |
| 6,625,083 B2 | 9/2003 | Vandenbroucke | | |
| 6,837,106 B2 | 1/2005 | Etkin et al. | | |

(Continued)

FOREIGN PATENT DOCUMENTS

WO      2009032601      3/2009

OTHER PUBLICATIONS

Nabighian, et al., "Historical development of the gravity method in exploration," Geophysics, vol. 70, No. 6, Nov.-Dec. 2005, pp. 63ND-89ND.*

(Continued)

*Primary Examiner* — Daniel L Murphy

(57) ABSTRACT

A technique facilitates collection and use of data on subterranean formations. The technique comprises obtaining gravity measurements through the use of seismic streamers. At least one streamer is provided such that each streamer has multiple sensors, e.g. accelerometers. The at least one streamer is towed with a tow vessel, and gravity data are accumulated via the multiple sensors during towing.

19 Claims, 2 Drawing Sheets

(56) References Cited

U.S. PATENT DOCUMENTS

| | | | |
|---|---|---|---|
| 6,876,599 B1* | 4/2005 | Combee | 367/21 |
| 6,883,638 B1* | 4/2005 | Maxwell et al. | 181/102 |
| 6,954,698 B2* | 10/2005 | Tryggvason | 702/5 |
| 6,992,951 B2* | 1/2006 | O'Brien et al. | 367/15 |
| 7,167,413 B1* | 1/2007 | Rouquette | 367/20 |
| 7,379,386 B2* | 5/2008 | Muyzert et al. | 367/63 |
| 8,616,054 B2 | 12/2013 | Paros et al. | |
| 2010/0031746 A1 | 2/2010 | Paros et al. | |
| 2010/0153050 A1* | 6/2010 | Zumberge et al. | 702/92 |
| 2012/0002504 A1 | 1/2012 | Muyzert et al. | |

OTHER PUBLICATIONS

Bell et al., "Gravity gradiometry resurfaces," The Leading Edge, Jan. 1997: pp. 55-59."

Dewall et al., "Ship Augmented Gravity Enhancement(SAGE)," IEEE, 2006: pp. 36-43.

Fairhead et al., "Advances in Gravity Survey Resolution," The Leading Edge, Jan. 2002: pp. 36-37.

Laws et al., "Sea surface shape derivation above the seismic streamer," Section II—Rhodes Workshop 2004, Geophysical Prospecting, 2006, vol. 54: pp. 817-828.

Zhdanov et al., "Three-dimensional regularized focusing inversion of gravity gradient tensor component data," Geophysics, Jul.-Aug. 2004, vol. 69*=(4): pp. 925-937.

Zhdanov et al., "Potential field migration for rapid interpretation of gravity gradiometry data," EGM International Workshop, Apr. 2010: pp. 1-5.

Zumberge et al., "Precision of seafloor gravity and pressure measurements for reservoir monitoring," Geophysics, Nov.-Dec. 2008, vol. 73(6): pp. WA133-WA141.

International Search Report and Written Opinion of PCT Application No. PCT/US2011/025285 dated Sep. 28, 2011: pp. 1-9.

* cited by examiner

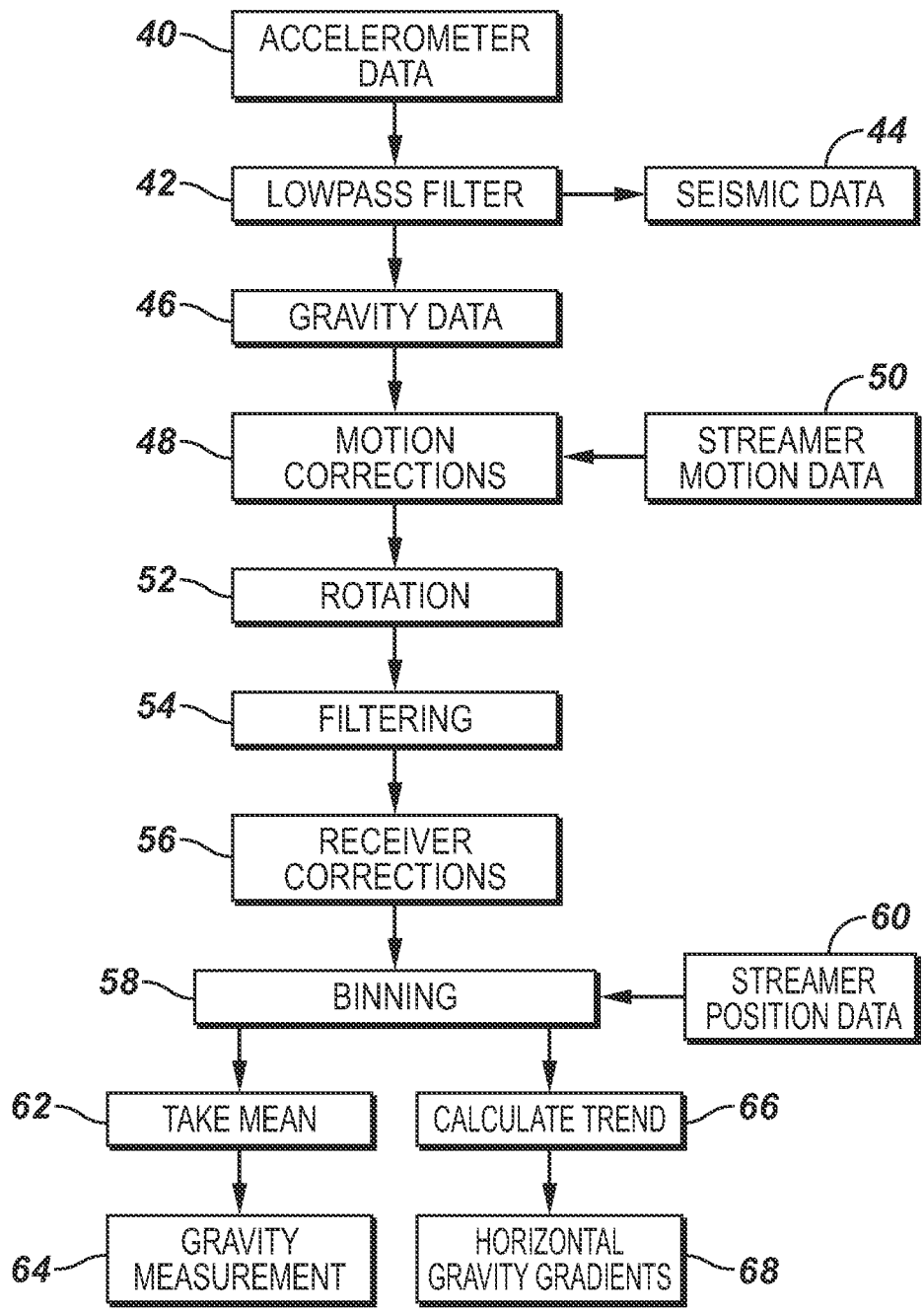

GRAVITY MEASUREMENTS USING SEISMIC STREAMERS

CROSS-REFERENCE TO RELATED APPLICATION

The present document is based on and claims priority to U.S. Provisional Application Ser. No. 61/309,254, filed Mar. 1, 2010.

BACKGROUND

Seismic surveys are performed in a variety of environments to gain a better understanding of the geometry and seismic wavespeeds of subterranean geological formations and structures. Gravity measurements also are made to provide complementary knowledge with respect to the distribution of mass in subterranean regions. Examples of gravity measurements include ship borne dynamic gravity measurements which may be made using, for example, an upgraded LaCoste & Romberg gravity meter. Ship borne gravimeters are normally mounted on gyro-stabilized platforms to minimize pitch and roll, and gravity signal outputs are heavily filtered to remove accelerations due to waves. In current practice, accurate vessel speed and direction measurements may be obtained from GPS and used to correct for gravimeter motion leading to the Eötvös correction for Coriolis acceleration, proportional to the eastward velocity component of the gravimeter. Large amplitude accelerations due to ocean waves have a dominant period of 5-10 s, and low-pass filtering below 3 minutes results in a residual ocean wave signal of less than 1 mGal. At periods longer than 1 minute, the Eötvös effect is the strongest perturbation but can be corrected accurately due to rapid sampling of navigation data at 1 s periods. Another ship borne gravity measurement method is Sea-Air Gravity Enhanced (SAGE) which is an enhanced marine inertial navigator system, WSN-7, based on a ring laser gyroscope. The ship borne systems use single gravity meters, although a vessel may operate two WSN-7 systems independently for redundancy. Current dynamic gravity measurements have a precision of about 0.2 mGal at a minimum wavelength of 0.5 km, where the spatial wavelength is determined by the filter applied to remove short period ocean wave accelerations. Additionally, sensors have been constructed to measure seismic and gravity data simultaneously. However, dynamic ship borne gravimeters remain limited to the precision described above.

Gravity gradiometry is a technique in which gradients of a gravity field are measured. The gravity gradiometry technique was initiated to improve spatial sensitivity to more local variations in mass density, and gravity gradiometers have been used in locating boundaries between density contrasts in the earth such as those due to salt bodies. More recently, dedicated equipment has been developed which detects differences of acceleration between sensors mounted on the diameter of a rotating disc. Such a sensor arrangement, in principle, allows separation of linear accelerations of the platform from the gradio-gravimetry signal, greatly reducing the sensitivity to both platform accelerations and the Eötvös effect. However, such instruments are expensive and have required deployment on dedicated vessels.

SUMMARY

In general, the present invention provides a methodology and a system for facilitating the collection and use of data on subterranean formations. The technique comprises obtaining precision gravity measurements through the use of seismic streamers. At least one and often a plurality of streamers is provided and constructed such that each streamer has multiple sensors, e.g. accelerometers. The at least one streamer is towed with a tow vessel, and gravity data are accumulated with the multiple sensors during towing.

BRIEF DESCRIPTION OF THE DRAWINGS

Certain embodiments of the invention will hereafter be described with reference to the accompanying drawings, wherein like reference numerals denote like elements, and:

FIG. 4 is a diagram illustrating one example for collecting, processing and providing data during a marine survey, according to an embodiment of the present invention.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique for data acquisition during a marine seismic survey. According to one aspect of the technique, gravity data are obtained using at least one multi-component seismic streamer. The gravity data may be related to, for example, measuring gravity and horizontal gravity gradients.

According to one embodiment, the technique employs a multi-component streamer survey system having a plurality of streamers. Each streamer may include accelerometers with a frequency response down to 0 Hz, and continuous or almost continuous recording. In addition, the system may provide accurate streamer position, speed and direction information. Another aspect of the survey system is that each multi-component streamer has a large number of sensors, e.g. accelerometers. In some embodiments, the accelerometers are spaced less than a meter apart along each multi-component streamer. The streamers also may have substantial length with the individual multi-component streamers exceeding, for example, 6 km. Thus, an individual streamer may contain over 10,000 accelerometers. Furthermore, in some embodiments of the overall survey system, a tow vessel tows 10 streamers or more which provides well over 100,000 accelerometers simultaneously recording data.

By employing the multi-component streamers described herein, the system provides a technique for accurately measuring gravity and horizontal gravity gradients. The multi-component seismic streamers which each include multiple accelerometers may be used for acquiring both gravity data and for acquiring seismic measurements. The large number of sensors and the corresponding large number of measurements made by the sensors during towing of the streamers enhances the signal-to-noise ratio of the gravity estimates and facilitates accumulation of gravity measurements throughout a survey region. The large number of sensors and corresponding sensor measurements enables ensemble averaging of the large number of sensors to achieve a desired, improved precision as opposed to the spatial and temporal averaging of a single gravity sensor.

Figure 1:
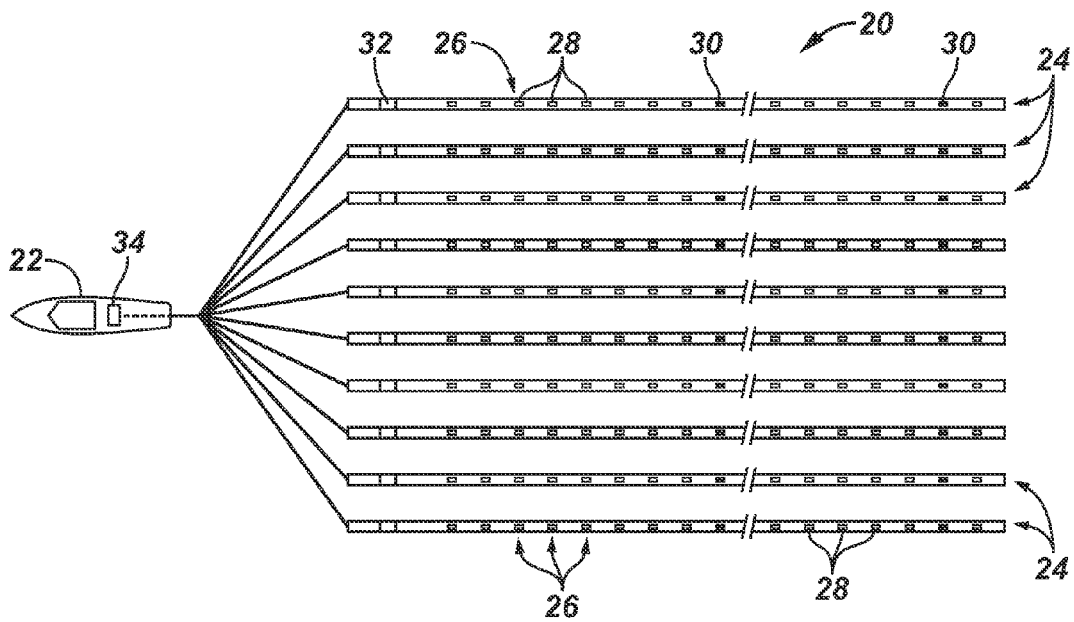
FIG. 1 is a schematic view of a seismic vessel pulling a plurality of seismic streamers in a marine survey area, according to an embodiment of the present invention.

Referring generally to FIG. 1, a general survey system 20 is illustrated to show one example of a system and method for acquiring gravity data and/or seismic data on subterranean formations throughout a survey area. In this example, survey system 20 is a marine system comprising a marine seismic survey vessel or tow vessel 22 designed to tow one or more multi-component streamers 24. Each multi-component streamer 24 comprises multiple sensors 26. The sensors 26 are designed to collect data related to the subterranean formations located below the streamers 24 throughout the survey area. According to one embodiment, multiple sensors 26 are designed to collect both gravity data and seismic data. The sensors 26 each comprise one or more accelerometers 28 connected at each sensor location along the streamer 24 to collect both the seismic accelerations and the gravity data. However, other types of sensors, e.g. pressure sensors 30 and/or additional parameter sensors, may be connected along streamers 24 to collect other types of useful data related to the survey.

In the example illustrated, the survey system 20 also comprises one or more seismic sources 32 which are towed by tow vessel 22. The seismic source or sources 32 may comprise air guns, marine vibrators, or other types of sources which are actuated, e.g. fired, to create a seismic signal. The tow vessel 22 carries out a seismic survey by firing the seismic sources 32 and by detecting reflected signals via sensors 26. The seismic data obtained by sensors 26 are relayed along the corresponding streamer 24 to a processing system 34 located on, for example, the tow vessel 22. However, processing system 34 may be located in whole or in part at other locations. In the present embodiment, the sensors 26 also are designed to collect gravity data which are similarly relayed to processing system 34 for storage and processing. The gravity data may be obtained, relayed, stored and processed without requiring any substantial change to the hardware of the streamers 24 or tow vessel 22. By way of example, processing system 34 may be a computer-based processing system utilizing one or more microprocessors to evaluate collected data. The processing system 34 also may be used to independently store gravity data and seismic data.

The gravity data are useful in evaluating the potential for hydrocarbons in subterranean environments. Differences in gravity measurements may be indicative of reservoirs of hydrocarbons. The earth's gravity is the magnitude of the acceleration experienced by a proof mass at a defined location. The gravitational vector, g, has three components, of which the vertical is so dominant that g is conventionally used to define the vertical direction. It is measured by the zero frequency, or DC signal, from an accelerometer orientated parallel to g, henceforth assumed to be vertical. Although conventional accelerometers might struggle to accurately measure the DC component, this is now possible with modern, broad-band micro-electromechanical system (MEMS) accelerometers. It is known that the seismic streamer 24 may slowly rotate during the survey, but this rotation may be compensated as discussed in greater detail below.

Figure 2:
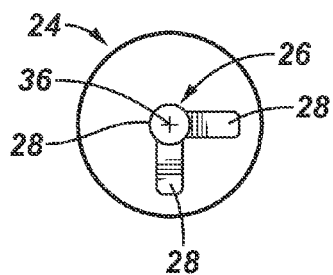
FIG. 2 is a schematic illustration of an example of a sensor comprising three orthogonal accelerometers, according to an embodiment of the present invention.

In one embodiment, each streamer 24 employs sensors 26 at multiple sensor locations and each sensor 26 uses the DC acceleration from three mutually orthogonal seismic accelerometers 28, mounted along and perpendicular to the streamer axis, to define the vertical direction. Hence, computation of the streamer angular displacement in two orthogonal, vertical planes and the components of the seismic response is enabled in the axial, vertical and transverse directions. As illustrated in FIG. 2, for example, each multi-component accelerometer sensor 26 may comprise a trio of accelerometers 28 mounted inside the streamer 24 at each sensor location. In this embodiment, the accelerometers 28 of a given sensor 26 are mounted parallel and perpendicular to an axis 36 of the streamer 24 and orthogonal with respect to each other, as illustrated. Alternatively, two mutually orthogonal accelerometers may be oriented through a gimbal system in a vertical plane containing the local streamer axis 36. In this alternate embodiment, each accelerometer sensor 26 comprises a first accelerometer 28 mounted to a gimbal mechanism 38 with an orientation perpendicular to the streamer axis 36 and a second accelerometer 28 mounted parallel to the streamer axis 36.

The earth's gravitational field varies with position, partly due to changes in latitude and elevation (which can be accounted for in principle) and partly as a result of changes in the density of sub-surface geological formations. The sensors 26 are designed to detect these changes and produce corresponding output signals. The latter signal which is representative of changes in the density of sub-surface geological formations can be used to assist seismic processing (e.g., helping to constrain velocity models for imaging and for interpreting large scale geological features). While absolute gravitational measurements are desirable, these are difficult to obtain and require accurate calibration against a base station before and after a survey. Relative changes in gravity with position, however, are still useful in characterizing gravitational anomalies from the sub-surface and are of benefit in imaging and in interpretation, provided the drift in the accelerometer is small. If the drift is not small but is linear with time, then calibration may be achieved by returning to a known location at intervals, albeit at a possible cost to the survey.

According to one embodiment of survey system 20, each streamer 24 contains a large number of densely spaced sensors 26 in the form of accelerometers 28 which record data with a bandwidth from 0 Hz to Nyquist (250 Hz is a typical frequency for a seismic survey). While the seismic tow vessel 22 is conducting a seismic survey, accelerometer data from sensors 26 are relayed to the processing system 34, e.g. a computer-based processing system located on tow vessel 22. It is possible to store all the data over the full bandwidth, however some embodiments of the present technique create a new data-set containing the low frequency part of the accelerometer data used in determining the gravity measurements. For this purpose the accelerometer data are filtered down to a relatively low frequency, e.g. well below 1 Hz, and stored with a sample period less than or equal to 0.5 s. The gravity data are continuously acquired and stored independently of the seismic shots fired by the tow vessel 22 via seismic sources 32. As this low frequency gravity dataset is being processed and stored on processing system 34, a separate data stream containing the seismic data is processed and stored. The seismic data are based on the relatively higher frequency data obtained from sensors 26/accelerometers 28. The diagram of FIG. 4 shows one example of the data flow.

Referring generally to FIG. 4, an illustration is provided as an example of one approach for obtaining, processing, and outputting gravity information and/or seismic information. As illustrated, accelerometer data are collected via the multiple accelerometers along each streamer 24, as represented by block 40. The accelerometer data are delivered to a low pass filter 42 of processing system 34 which separates the data into the relatively high-frequency seismic data (see block 44) and the relatively low frequency gravity data (see block 46). The gravity data may be acquired and stored independently of shots fired by seismic sources 32; and the gravity data and seismic data also may be independently processed and stored via processing system 34.

The seismic data 44 are processed according to various customary procedures, and the gravity data 46 may be corrected for environmental parameters. For example, the gravity data may be processed by a motion correction module 48 of processing system 34 based on streamer motion data, as represented by block 50. The motion corrections may comprise correction for sensor rotation, as indicated by block 52, and the data may be filtered, for example, to improve the signal to noise ratio, as indicated by block 54. The processing system 34 also may utilize a receiver correction module 56 to process the gravity data in a manner designed to provide receiver corrections. For example, the gravity data may be subjected to a binning process, as represented by block 58, based on streamer position data, as represented by block 60.

Once the various corrections have been performed, averaging techniques may be employed, e.g. taking mean averages, as represented by block 62. The averaging facilitates determination of desired gravity measurements, as indicated by block 64. The corrected gravity data also may be used to calculate trends, as represented by block 66, which enables calculation of horizontal gravity gradients, as represented by block 68. The gravity measurements and/or seismic measurements may be output to a display device of processing system 34, or otherwise output, to provide an operator with desired information on the subterranean formation.

Depending on the parameters of a given survey area, the specific survey equipment, and the survey techniques employed, various corrections may be applied to the raw gravity data collected by sensors 26. Examples of such corrections are described above with reference to FIG. 4. However, specific types of corrections and other processing of the data may be adjusted according to the specific areas, equipment and techniques. Examples of specific processing/adjustments of the gravity data include tidal corrections based on the position of the sun and the moon and a Bouguer correction for the average streamer depth. A further correction for the shape of sea-surface may be applied. Reliable wave height data can be obtained from low frequency pressure data via available methods, such as the method described by Laws, R. and E. Kragh, 2006, *Sea Surface Shape Derivation above the Seismic Streamer*, Geophysical Prospecting 54, No. 6 (2006): 817-828. Eötvös corrections may be applied to compensate for the directional movement of the sensors 26. This correction can utilize the available, accurate streamer position system of the seismic tow vessel 22 to calculate streamer position, speed and direction.

Figure 3:
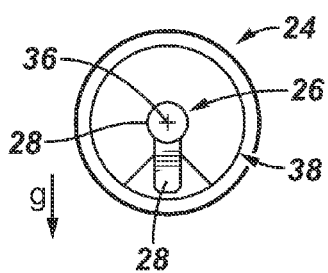
FIG. 3 is a schematic illustration of an alternate example of a sensor mounted on a gimbal system, according to an embodiment of the present invention.

Subsequently, various receiver corrections may be applied. For example, seawater temperature corrections may be applied to the accelerometer readings. Next, the gravitational acceleration may be calculated by taking the squared sum of the three orthogonal acceleration measurements, at least when sensors 26 comprise orthogonal accelerometers 28, as illustrated in FIG. 2. For quality control, the inline component may be obtained and monitored through mathematical operations such as projection and rotation, enabling correction of streamer sag. Such numerical operations also may be required even when gimbaled accelerometers are used, as illustrated in FIG. 3, as streamer sag may tilt the gimbaled component off vertical. In addition to correcting for cable sag, the axial acceleration component (accelerometer) may also be useful for estimating changes in axial velocity due to tugging, affecting the Eötvös correction.

Noise reduction may be carried out based on the principle that a large number of sensors 26 in the streamer 24 will pass over the same location during the survey. When analyzing the dataset in the temporal and spatial dimensions it is clear that a gravity signal will move through the dataset with the streamer's speed while many other signals and perturbations, such as the effect of wave heights and streamer shapes, will move with different speed. A filter may be applied that enhances those signals which propagate with the streamer speed, attenuating signals with other velocities (see filter block 54 in FIG. 4).

In many applications, calibration of the accelerometers can be very helpful in obtaining the desired gravity measurements, as illustrated by blocks 56, 58, 60 of FIG. 4. Specific examples of calibration are further illustrated in the flowchart of FIG. 5 and are described in greater detail as follows. Initially the orthogonal accelerometers 28 of individual sensors 26 may be calibrated at each sensor location to enable better measurement of gravity data, as represented by block 70. This can be done by an enforced streamer rotation, e.g. using controlled birds, which allows the DC components from the three orthogonal accelerometers to be calibrated relative to each other and to the nominal gravitational acceleration, based on prior knowledge for a standard location (as a gravitational base station).

Figure 5:
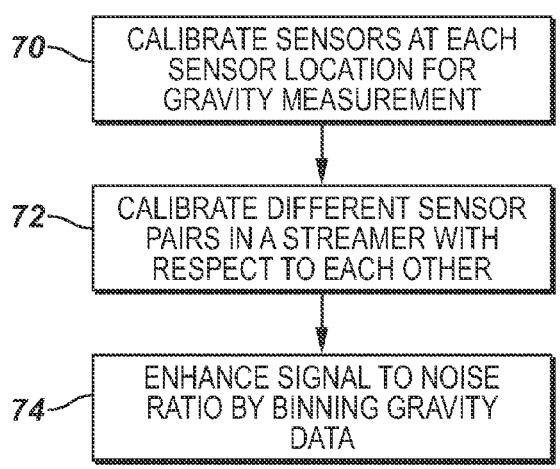
FIG. 5 is a flowchart illustrating one example for calibrating gravity data obtained during the marine survey, according to an embodiment of the present invention.

A subsequent calibration may comprise calibrating the different sensor trios in a streamer with respect to each other, as represented by block 72 of FIG. 5. Here, data are selected during the survey from arbitrary rotated sensors that follow a certain path along the surface, i.e. all sensor measurements are taken at the same large number of positions. Subsequently, for each sensor, the root mean square (RMS) energy is calculated over the entire surface path. As all the selected sensors 26 have passed over the same subsurface gravity anomalies their RMS energy should be the same. Any variation is due to calibration, noise and drift errors. To reduce these errors, a sensor calibration coefficient is calculated. This could be achieved by, for example, dividing the RMS energy for each sensor 26 by the RMS average over all sensors. The gravity measurements for each sensor 26 may then be divided by their calibration coefficient.

To further enhance the signal to noise ratio of the gravity data, the measurements from nearby sensors 26 are summed according to a binning procedure, as represented by block 74. According to this procedure, a surface grid is initially determined. The grid or bin size may be between, for example, 100-500 m square. Using the positioning data, the time period over which a particular sensor 26 was in a particular bin is determined. The sensor's gravity data for this particular time window is then allocated to this bin. Based on this process, each bin may eventually contain a large number of sensor measurements, e.g. more than 10,000 sensor measurements, including ones from neighboring streamers towed at separations of, for example, 25 m and more. In addition, data from different sail lines can be included in the bins.

A gravity measurement may be obtained by calculating the mean measurement in each bin. Alternatively, other statistical measures may be employed, such as calculating the median values. Outliers in the data-set may be removed prior to calculation of the mean. The average binned gravity measurement is one deliverable of the present method. Use of ensemble averaging of data from the large number of sensors 26 facilitates achieving the desired, enhanced precision with respect to gravity measurements.

The horizontal gradients of the gravity field also can be obtained from the binned dataset. To do so, one calculates the linear trend in two horizontal orthogonal directions of the measurements in a bin. The calculations may be performed on processing system 34, although it may be desirable to first remove some outliers in the data set. It also may be desirable to calculate these horizontal gradients using larger bins than used for the gravity measurement itself.

The survey system 20 may be used for exploration surveys and also for repeated surveys to detect, for example, the movement of the contact between hydrocarbons and water in the subsurface. While it is anticipated that a higher level of sensor precision may be needed to detect production-induced density changes in the sub-surface compared to the precision needed for exploration imaging and interpretation, these 4D gravity surveys may be optimized by carrying them out at an appropriate time interval, months or years apart, to maximise the expected signal. The 4D gravity measurements also may require a different position precision as compared to 4D seismic data.

The embodiments discussed above provide examples of systems, components and methodologies that may be used to improve the results of surveys by obtaining gravity data through the use of multi-component seismic streamers. Depending on the specific application and environment, the arrangement of systems and components may be changed or adjusted to accommodate the characteristics of the application and environment. In an alternate embodiment, for example, the streamers may be towed at a depth to greatly reduce vertical accelerations due to wave motion, which may remove the need to filter the gravity response. Additionally, the number of streamers, sensors, sources and other components may be adjusted according to the specific parameters of a given application. Additionally, individual or multiple control systems 34 may be employed with a variety of algorithms and data processing techniques to correct, calibrate and/or adjust the raw gravity data to provide useful gravity measurements. The processing of gravity data and seismic data may be performed on the same processing system 34 or on separate, individual processing systems. Additionally, the processing may be performed with computer-based systems, such as microprocessor based computers, deployed on the tow vessel 22 and/or at other locations.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method of obtaining gravity measurements using seismic streamers, comprising:
    providing at least one multi-component streamer, each multi-component streamer having a plurality of sensors;
    towing the at least one multi-component streamer with a tow vessel;
    accumulating gravity data with the plurality of sensors during towing;
    ensemble averaging the gravity data from the plurality of sensors to enhance the precision of the gravity measurements;
    processing the gravity data to correct for sensor rotation due to motion of the at least one multi-component streamer during towing; and
    determining information related to a subterranean formation based on horizontal gravity gradients determined from the gravity data accumulated with the plurality of sensors.

2. The method as recited in claim 1, wherein providing comprises providing each multi-component streamer with the plurality of sensors in the form of accelerometers.

3. The method as recited in claim 2, wherein providing further comprises providing each multi-component streamer with a plurality of pressure sensors.

4. The method as recited in claim 1, further comprising conducting a seismic

5. The method as recited in claim 4, wherein conducting the seismic survey comprises collecting seismic data with the plurality of sensors; and wherein determining comprises determining whether a reservoir of hydrocarbons is present.

6. The method as recited in claim 5, wherein towing further comprises towing seismic sources.

7. The method as recited in claim 6, wherein accumulating comprises continuously acquiring and storing the gravity data independently of shots fired by the seismic sources; and further comprising independently processing and storing the seismic data.

8. The method as recited in claim 4, wherein accumulating comprises accumulating gravity data from a low frequency dataset while seismic measurements are obtained from a higher frequency dataset collected from the same plurality of sensors.

9. The method as recited in claim 1, wherein accumulating comprises accumulating data on horizontal gradients of gravity.

10. The method as recited in claim 1, further comprising filtering, binning, and averaging the gravity data.

11. A method of conducting a seismic survey, comprising:
    towing a plurality of streamers with a tow vessel in which each streamer comprises multiple accelerometers;
    collecting seismic data from the multiple accelerometers during towing;
    simultaneously collecting gravity data from the multiple accelerometers during towing;
    independently processing and storing the seismic data and the gravity data on at least one processing system; and
    processing the gravity data to determine gravity gradients which provide information on a subterranean formation.

12. The method as recited in claim 11, further comprising correcting the gravity data to compensate for environmental parameters; and wherein processing comprises determining horizontal gravity gradients indicating the presence of a reservoir of hydrocarbons.

13. The method as recited in claim 11, further comprising calibrating the accelerometers at each sensor location by calibrating orthogonal accelerometers.

14. The method as recited in claim 11, further comprising calibrating the accelerometers by calibrating accelerometers, located at different sensor locations along each streamer, with respect to each other.

15. The method as recited in claim 11, further comprising enhancing the signal to noise ratio of the gravity data by summing measurements from accelerometers of the multiple accelerometers according to a binning procedure.

16. A system, comprising:
    a survey system having at least one streamer with each streamer comprising a plurality of sensors, the survey system further comprising a processing system to process data transferred from the plurality of sensors of each streamer, wherein the processing system processes the data in a manner which provides both seismic information and gravity measurements, the processing system being configured to ensemble average gravity data from the plurality of sensors to enhance the gravity measurements, the processing system comprising at least one filter to correct for environmental parameters and to determine data related to a subterranean formation via horizontal gravity gradients.

17. The system as recited in claim 16, wherein the plurality of sensors comprises a plurality of accelerometers.

18. The system as recited in claim 17, wherein the survey system comprises at least one seismic source.

19. The system as recited in claim 16, wherein the survey system comprises a plurality of streamers; and wherein the data related to the subterranean formation comprises data related to the presence of hydrocarbon deposits.

* * * * *